US010961074B2

(12) United States Patent
Miwa

(10) Patent No.: US 10,961,074 B2
(45) Date of Patent: Mar. 30, 2021

(54) IMAGE READING DEVICE

(71) Applicant: BROTHER KOGYO KABUSHIKI KAISHA, Aichi-ken (JP)

(72) Inventor: Atsushi Miwa, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 197 days.

(21) Appl. No.: 16/351,438

(22) Filed: Mar. 12, 2019

(65) Prior Publication Data

US 2019/0306350 A1 Oct. 3, 2019

(30) Foreign Application Priority Data

Mar. 30, 2018 (JP) ............................ JP2018-067034

(51) Int. Cl.

*B65H 29/50* (2006.01)
*H04N 1/00* (2006.01)
*B65H 1/08* (2006.01)
*B65H 5/36* (2006.01)
*B65H 1/14* (2006.01)

(52) U.S. Cl.

CPC .............. *B65H 29/50* (2013.01); *B65H 1/08* (2013.01); *B65H 1/14* (2013.01); *B65H 5/36* (2013.01); *H04N 1/00525* (2013.01); *H04N 1/00551* (2013.01); *H04N 1/00615* (2013.01); *B65H 2404/1421* (2013.01); *B65H 2404/1521* (2013.01); *B65H 2404/6112* (2013.01); *H04N 2201/0081* (2013.01)

(58) Field of Classification Search

CPC ... B65H 1/08; B65H 1/14; B65H 1/18; B65H 1/20; B65H 5/36; B65H 7/00; B65H 7/20; B65H 29/20; B65H 29/22; B65H 29/50; B65H 2404/142; B65H 2404/1421; B65H 2404/152; B65H 2404/1521; B65H 2404/6112; B65H 2511/152; B65H 2511/30; H04N 1/00615

See application file for complete search history.

(56) References Cited

U.S. PATENT DOCUMENTS

2005/0195450 A1* 9/2005 Shoji .................. H04N 1/00822 358/497
2015/0274472 A1* 10/2015 Momiyama ............ B65H 29/70 271/207
2019/0238700 A1* 8/2019 Ito .......................... B65H 29/50

FOREIGN PATENT DOCUMENTS

JP 10-167545 A 6/1998
JP 2005-8283 A 1/2005

* cited by examiner

*Primary Examiner* — Prasad V Gokhale
(74) *Attorney, Agent, or Firm* — Kenealy Vaidya LLP

(57) ABSTRACT

An image reading device includes: a controller which performs a first drive operation for rotating the discharge roller, and a second drive operation for moving the discharge guide between the third position and the fourth position. The controller stops the first drive operation when performing the second drive operation, and stops the second drive operation when performing the first drive operation.

6 Claims, 11 Drawing Sheets

IMAGE READING DEVICE

CROSS-REFERENCE TO RELATED APPLICATION

This application claims priorities from Japanese Patent Application No. 2018-067034 filed on Mar. 30, 2018, the entire subject matters of which is incorporated herein by reference.

TECHNICAL FIELD

The present disclosure relates to an image reading device.

BACKGROUND

JP-A-2005-008283 discloses is a document feeding device which is an example of an image reading device of the related art. The document feeding device is provided with a sheet feed tray, a sheet discharge tray, and a conveyance guide. The sheet feed tray supports a document to be supplied. The sheet discharge tray is positioned below the sheet feed tray and supports the document to be discharged. The conveyance guide conveys the document from the sheet feed tray to the sheet discharge tray. In the middle of the conveyance guide, an image reading position for reading an image on the document to be conveyed on the conveyance guide is set.

The sheet feed tray moves upward according to a decrease of sheets supported by the sheet feed tray and approaches a document pickup unit. The document feeding device further includes a swing conveyance unit and a discharge roller. The swing conveyance unit includes a discharge opening for discharging the document conveyed by the conveyance guide to the sheet discharge tray. The swing conveyance unit moves upward according to a decrease of the document supported by the sheet feed tray, thereby separating the discharge opening from the sheet discharge tray. Specifically, a link member is installed between the sheet feed tray and the swing conveyance unit, and the discharge opening of the swing conveyance unit ascends and descends according to the ascent and descent of the sheet feed tray. The discharge roller discharges the sheet through the discharge opening. In JP-A-2005-008283, a configuration of a rotation drive of the discharge roller is not disclosed.

Meanwhile, an image reading device including the same configuration as that of the document feeding device described above is assumed to be adopted. The image reading device is provided with a supply tray including a movable body, a discharge guide, and a discharge roller. The discharge guide includes a discharge opening for discharging a sheet to a discharge tray. A link member is installed between a movable plate of the supply tray and the discharge guide. The discharge opening of the discharge guide ascends and descends according to the ascent and descent of the movable plate of the supply tray. The discharge roller discharges the sheet through the discharge opening.

However, since a configuration of a rotation drive of the discharge roller is not disclosed in JP-A-2005-008283, and the configuration of the rotation drive of the discharge roller is not apparent even in the image reading device, there is a possibility that a movement of the discharge guide influences a sheet in contact with the discharge roller when the discharge roller rotates and a reading sensor performs a reading operation. In this case, a conveyance speed of the sheet may fluctuate, thereby causing a possibility that reading accuracy of the reading sensor deteriorates.

SUMMARY

The present disclosure has been made in view of the above circumstances, and one of objects of the present disclosure is to provide an image reading device capable of preventing the reading accuracy of the reading sensor from deteriorating.

According to an illustrative embodiment of the present disclosure, there is provided an image reading device including: a supply tray configured to support a sheet to be supplied, the support tray including a movable plate that is configured to move from a first position to a second position according to a decrease in the number of the sheet to be supported by the supply tray, the second position being higher than the first position; a discharge tray positioned below the supply tray, the discharge tray being configured to support the sheet to be discharged; a conveyance guide configured to convey the sheet from the supply tray to the discharge tray; a reading sensor which reads an image on the sheet to be conveyed on the conveyance guide; a discharge guide including a discharge opening for discharging the sheet conveyed by the conveyance guide to the discharge tray, the discharge guide being configured to be movable from a third position to a fourth position a according to the decrease in the number of the sheet to be supported by the supply tray, the fourth position being higher than the third position; a discharge roller configured to discharge the sheet through the discharge opening; and a controller that operates to perform a first drive operation for rotating the discharge roller, and a second drive operation for moving the discharge guide between the third position and the fourth position, wherein the controller is configured to stop the first drive operation when performing the second drive operation, and stop the second drive operation when performing the first drive operation.

DETAILED DESCRIPTION

Hereinafter, an embodiment according to the present disclosure will be described with reference to the drawings.

Embodiment

Figure 1:
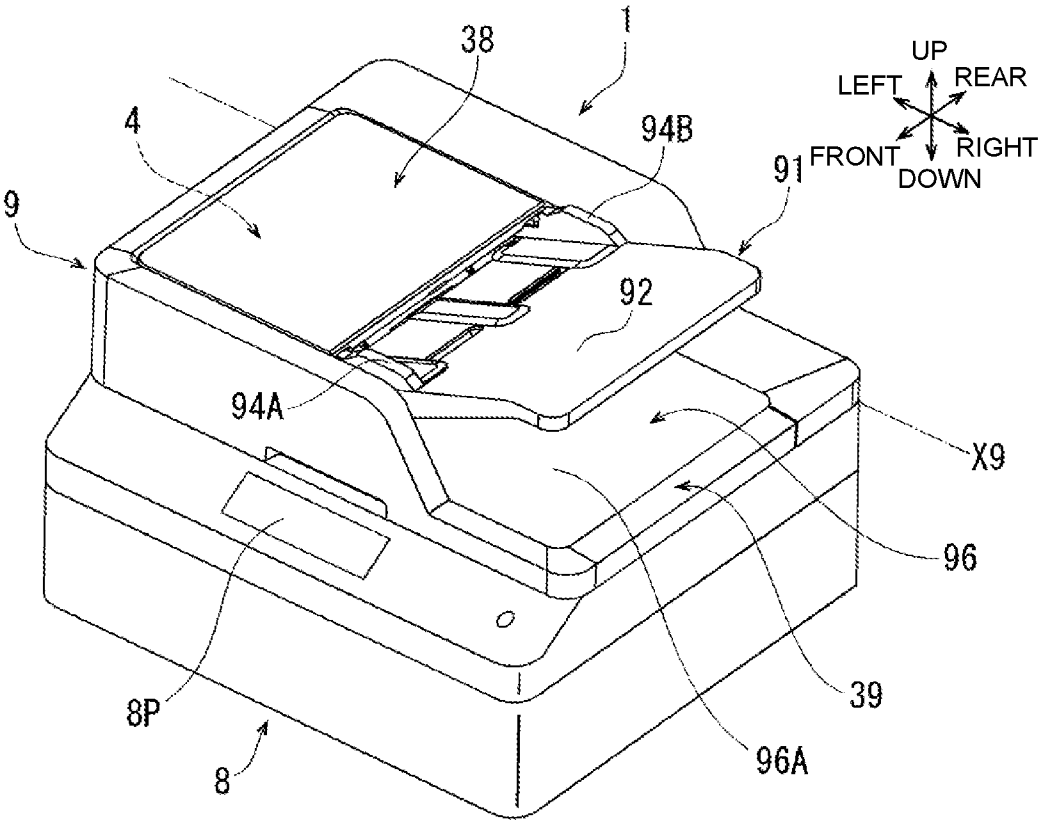
FIG. 1 is a perspective view illustrating an image reading device according to an embodiment.
Figure 2:
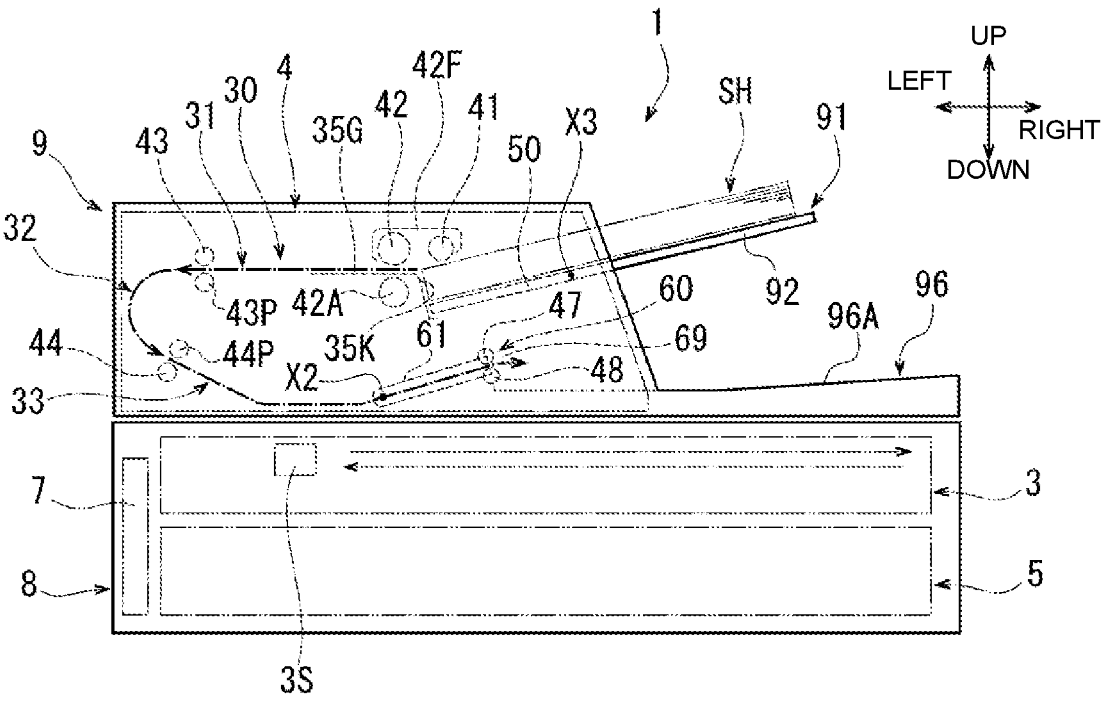
FIG. 2 is a schematic front view illustrating the image reading device according to the embodiment.

As illustrated in FIG. 1, an image reading device 1 of an embodiment is an example of a specific aspect of the image reading device of the present disclosure. In FIG. 1, a side on which an operation panel 8P is disposed is defined as a front side of a device, and a side which comes to the left when facing the operation panel 8P is defined as a left side thereof, thereby displaying respective directions of front, rear, left, right, upper, and lower sides. Then, each direction illustrated in each drawing from FIG. 2 is displayed corresponding to each direction illustrated in FIG. 1. Hereinafter, respective components provided in the image reading device 1 will be described while referring to the accompanying drawings.

<Overall Configuration>

As illustrated in FIGS. 1 to 4, the image reading device 1 includes a main body 8, an opening and closing part 9, an image forming unit 5, a reading unit 3, an automatic conveyance mechanism 4, and a controller 7. The main body 8 is a flat and approximately box-shaped body. As illustrated in FIG. 1, the operation panel 8P which is a touch panel, and the like is provided on a front surface of the main body 8.

Figure 5:
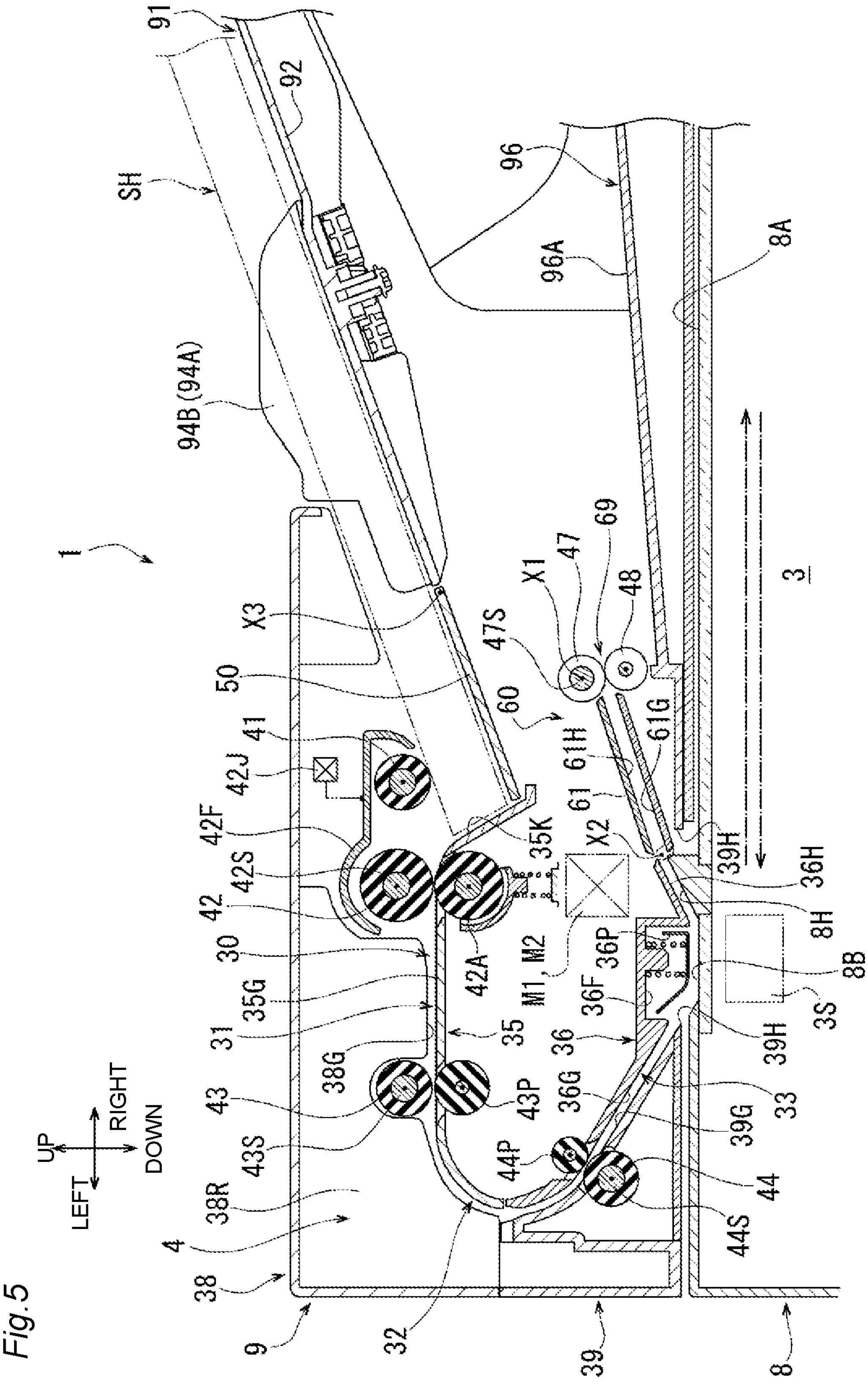
FIG. 5 is a partial cross-sectional view illustrating the image reading device according to the embodiment.

As illustrated in FIG. 2, the image forming unit 5 is stored at a lower portion in the main body 8. The image forming unit 5 forms an image on a sheet by an ink jet method, a laser method, or the like. As illustrated in FIGS. 2 and 5, the reading unit 3 is positioned at an upper portion in the main body 8. The reading unit 3 is used when reading an image on a document. The automatic conveyance mechanism 4 is provided in the opening and closing part 9. The automatic conveyance mechanism 4 is used when allowing the reading unit 3 to read an image on a sheet SH while sequentially conveying the sheet SH supported by a supply tray 91 along a conveyance guide 30.

Figure 4:
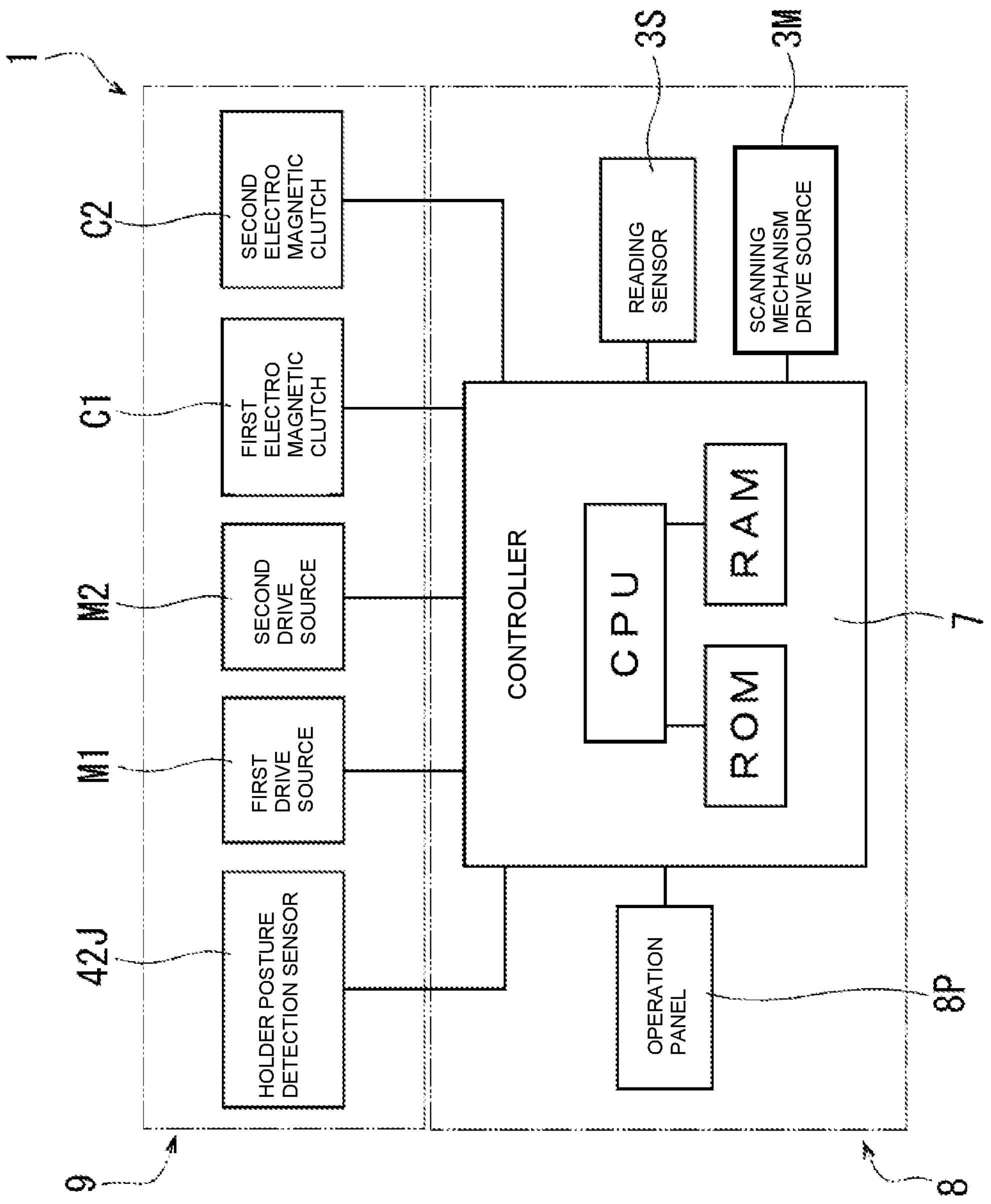
FIG. 4 is a block diagram illustrating the image reading device according to the embodiment.

As illustrated in FIGS. 2 and 4, the controller 7 is stored at a position along a left side surface in the main body 8. The controller 7 is formed as a microcomputer mainly including a CPU, a ROM, and a RAM. The ROM stores a program for the CPU to control various operations of the image reading device 1, a program for performing identification processing, and the like. The RAM is used as a storage region for temporarily recording data and signals used when the CPU executes the programs, or as a work region for data processing. The controller 7 controls the image forming unit 5, the reading unit 3, the automatic conveyance mechanism 4, and the operation panel 8P.

As illustrated in FIG. 5, platen glass is disposed on an upper surface of the main body 8, and a document supporting surface 8A with a large area is formed by an upper surface of the platen glass. Further, another platen glass is disposed on the left side further than the document supporting surface 8A on the upper surface of the main body 8, and an elongated reading surface 8B is formed in a front and rear direction by an upper surface of the another platen glass.

The document supporting surface 8A supports the document from below when the reading unit 3 reads an image on the document in a stationary state. The document which is an object to be read includes a sheet such as a paper or an OHP sheet, as well as a book, and the like.

The reading surface 8B contacts the conveyed sheet SH from below when the reading unit 3 reads the image on the sheet SH conveyed one by one by the automatic conveyance mechanism 4. A guide protruding unit 8H is provided between the document supporting surface 8A and the reading surface 8B on the upper surface of the main body 8. The guide protruding unit 8H scoops up the sheet SH to be conveyed while contacting the reading surface 8B and guides the sheet SH so as to be inclined upward to the right.

Further, in the embodiment, an object whose image is read out by using the document supporting surface 8A is described as a document, and an object whose image is read out while being conveyed by the automatic conveyance mechanism 4 is described as a sheet. The document and the sheet may be substantially the same.

As illustrated in FIG. 1, the opening and closing part 9 is supported to be able to swing around an opening and closing axis center X9 extending in the left and right direction by a hinge, which is not illustrated, disposed at a rear end part of the main body 8. The opening and closing part 9 covers the document supporting surface 8A and the reading surface 8B from above in a closed state illustrated in FIGS. 1 and 5, and the like. Although the drawing is omitted, the opening and closing part 9 displaces the document supporting surface 8A and the reading surface 8B to an open position where the document supporting surface 8A and the reading surface 8B are exposed by swinging around the opening and closing axis center X9 so that the front end part thereof is displaced upward and rearward. Accordingly, a user can support the document which is an object to be read on the document supporting surface 8A.

Further, when describing a configuration, an internal structure, and the like of the opening and closing part 9, a posture of the opening and closing part 9 in a closed state is set as a reference in the up and down direction and the front and rear direction.

The reading unit 3 includes a reading sensor 3S stored at an upper portion in the main body 8 as illustrated in FIGS. 2 to 6, a scanning mechanism drive source 3M illustrated in FIG. 4, and a scanning mechanism, which is not illustrated, driven by the scanning mechanism drive source 3M. As the reading sensor 3S, a well-known image reading sensor such as a contact image sensor (CIS), a charge coupled device (CCD), and the like is used.

As illustrated in FIG. 5, the reading sensor 3S is positioned below the document supporting surface 8A and the reading surface 8B. The scanning mechanism, which is not illustrated, is driven by the scanning mechanism drive source 3M when reading the image on the document supported by the document supporting surface 8A, and the reading sensor 3S is reciprocated in the left and right direction below the document supporting surface 8A in the main body 8. Further, the scanning mechanism, which is not illustrated, is driven by the scanning mechanism drive source 3M when the reading sensor 3S reads the image on the sheet SH conveyed by the automatic conveyance mechanism 4, and the reading sensor 3S is stopped under the reading surface 8B in the main body 8. A position where the reading sensor 3S is stopped under the reading surface 8B is a predetermined stationary reading position.

Figure 6:
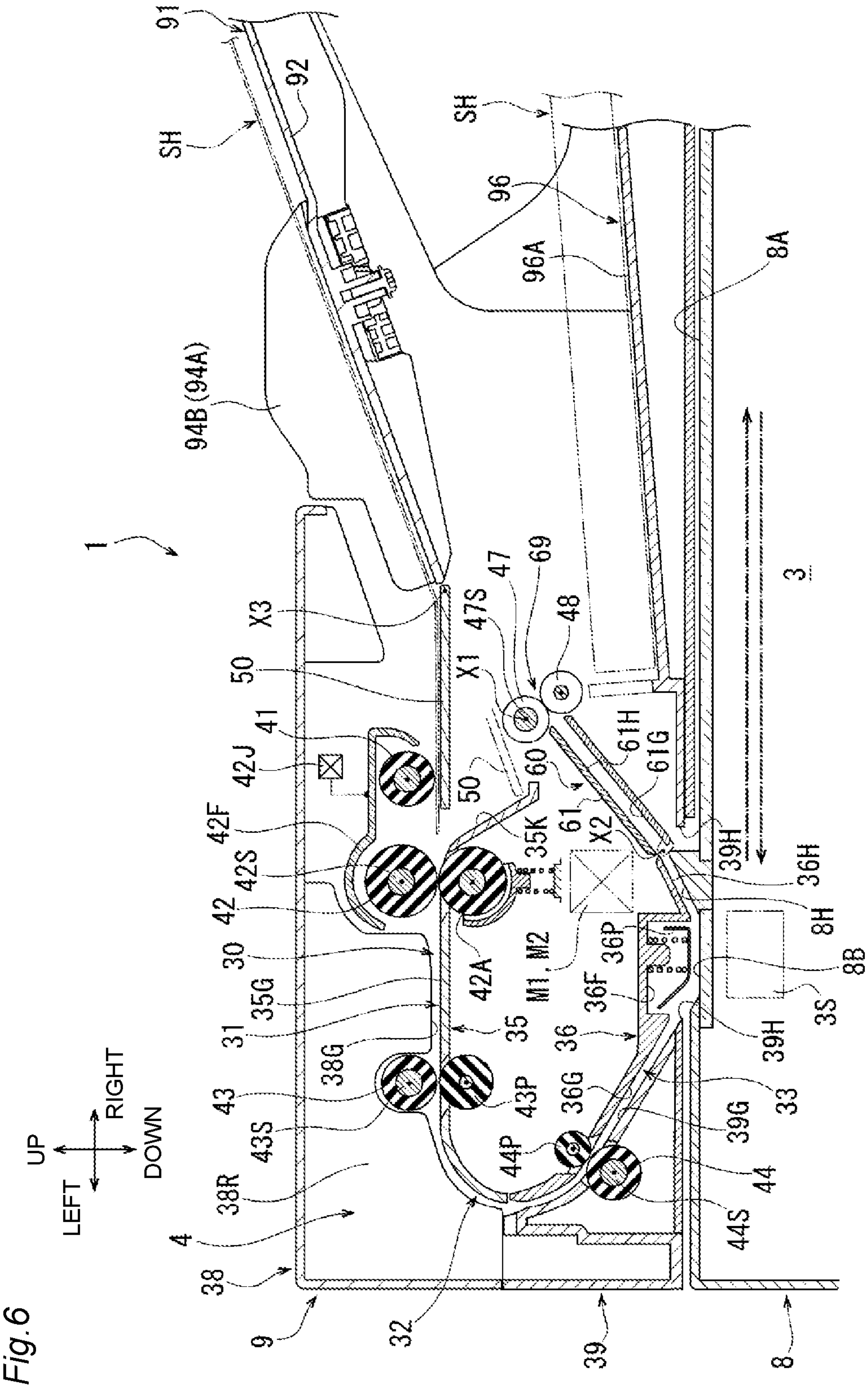
FIG. 6 is a partial cross-sectional view illustrating the image reading device according to the embodiment.

As illustrated in FIGS. 5 and 6, the opening and closing part 9 includes a base member 39, a first chute member 35, a second chute member 36, and a cover member 38.

The base member 39 forms a bottom wall of the opening and closing part 9. In the base member 39, a rectangular hole 39H in which a region opposite to the reading surface 8B and the guide protruding unit 8H is cut out in an approximately rectangular shape is formed. A conveyance surface 39G is formed at a portion positioned on the left side further than the rectangular hole 39H in the base member 39. A left end part of the conveyance surface 39G is curved to be inclined downward to the right by changing a direction from a downward direction. The conveyance surface 39G is inclined downward to a left end edge of the rectangular hole 39H.

The second chute member 36 is disposed above a left portion of the base member 39. A pressing member holding part 36F and guide surfaces 36G and 36H are formed in the second chute member 36. The pressing member holding part 36F is a recessed part which is recessed upward at a position opposite to the reading surface 8B. In the pressing member holding part 36F, a pressing member 36P is held to be able to be displaced in the up and down direction. The pressing member 36P presses the sheet SH which is conveyed while contacting the reading surface 8B from above, thereby preventing the sheet SH from floating from the reading surface 8B. The guide surface 36G is positioned on the left side further than the pressing member holding part 36F. A left end part of the guide surface 36G is curved along the left end part of the conveyance surface 39G of the base member 39. The guide surface 36G is inclined downward to the right along a portion inclined downward of the conveyance surface 39G of the base member 39. The guide surface 36H is positioned on the right side further than the pressing member holding part 36F. The guide surface 36H is inclined upward to the right along the guide protruding unit 8H of the main body 8.

The first chute member 35 is disposed above the second chute member 36. A regulation surface 35K and a conveyance surface 35G are formed in the first chute member 35. The regulation surface 35K is inclined upward to the left from a right end part of the first chute member 35. The conveyance surface 35G is connected to an upper end of the regulation surface 35K and extends approximately horizontally to the left. A left end part of the conveyance surface 35G is curved to change a direction thereof from the left direction to the downward direction.

The cover member 38 is disposed above the first chute member 35. A guide surface 38G which is formed of lower end edges of a plurality of ribs 38R protruding downward is formed in the cover member 38. A right end part of the guide surface 38G is opposite to the conveyance surface 35G from above at a position deviated to the left side further than a connection part between the regulation surface 35K and the conveyance surface 35G in the first chute member 35. The guide surface 38G extends approximately horizontally to the left along the conveyance surface 35G of the first chute member 35. A left end part of the guide surface 38G is curved along the left end part of the conveyance surface 35G of the first chute member 35.

Figure 7:
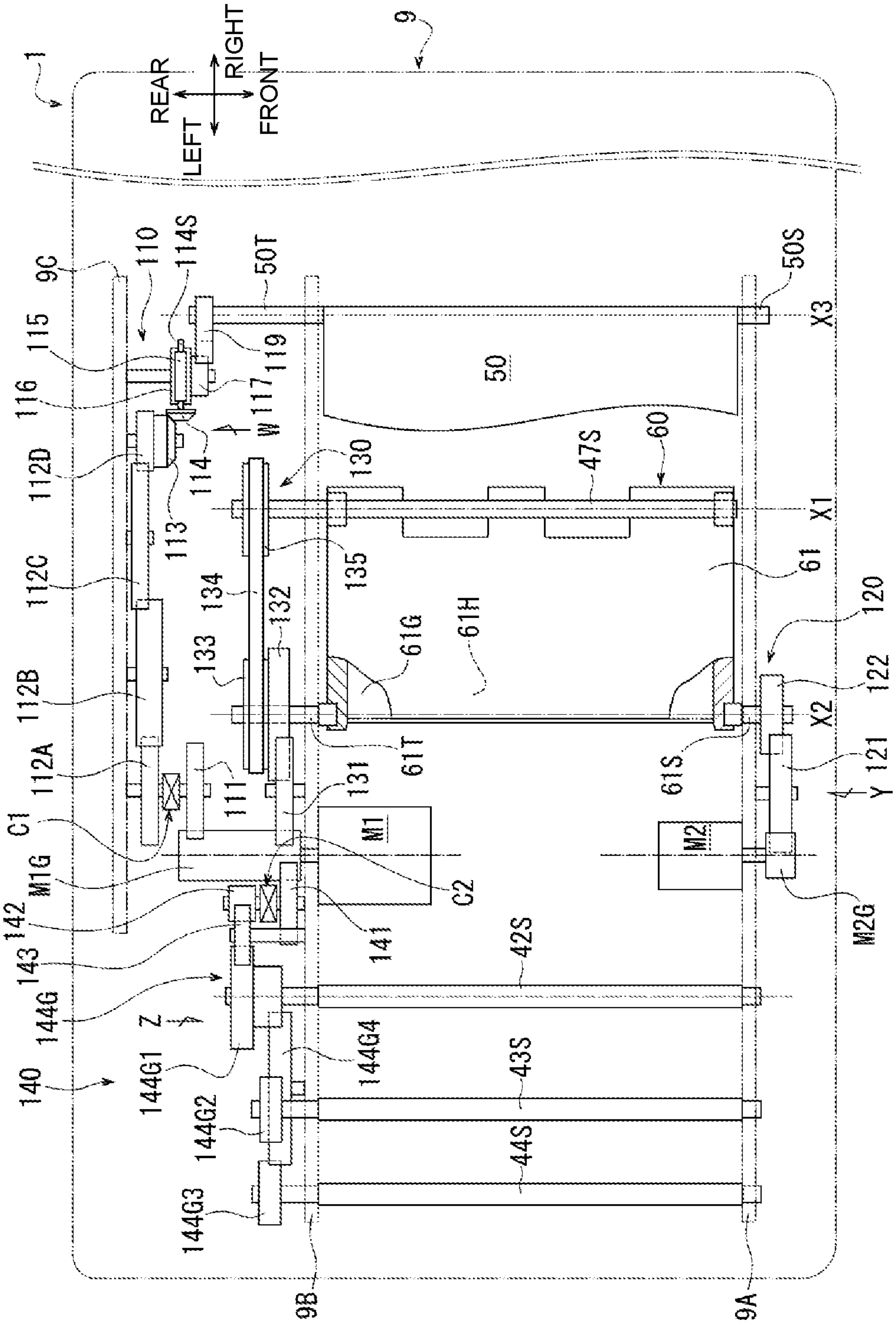
FIG. 7 is a schematic top view illustrating the image reading device according to the embodiment.

As illustrated in FIG. 7, the opening and closing part 9 includes a first side frame 9A, a second side frame 9B, and a third side frame 9C. The first side frame 9A is disposed to extend in the left and right direction on a front side of the opening and closing part 9. The second side frame 9B is disposed to extend in the left and right direction on a rear side of the opening and closing part 9. The third side frame 9C is disposed to extend in the left and right direction between the rear side of the opening and closing part 9 and the second side frame 9B, thereby supporting the second side frame 9B. The first side frame 9A, the second side frame 9B, and the third side frame 9C form a part of internal frames of the opening and closing part 9, respectively.

Figure 8:
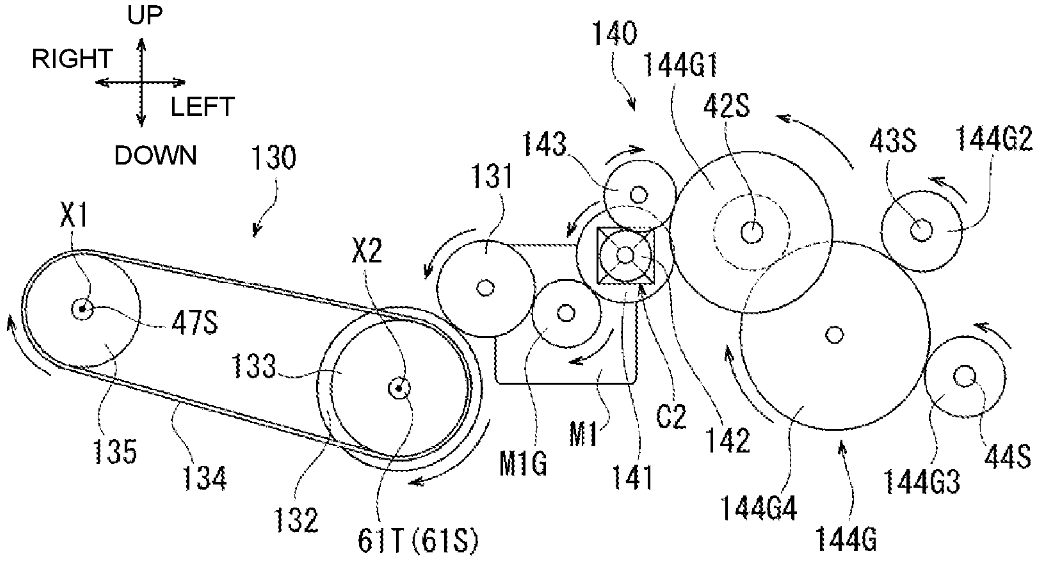
FIG. 8 is a schematic diagram illustrating a first drive source, a third drive train, a fourth drive train, and the like when viewed from an arrow Z direction in FIG. 7.

The first side frame 9A and the second side frame 9B are opposite to each other in the front and rear direction so that the guide surface 38G of the cover member 38, the regulation surface 35K and the conveyance surface 35G of the first chute member 35, the guide surfaces 36G and 36H of the second chute member 36, and the conveyance surface 39G of the base member 39, all of which are illustrated in FIG. 5, and the like, are sandwiched therebetween. Further, in FIG. 7, illustration of a supply tray main body 92 of the supply tray 91 is omitted for ease of description. Additionally, FIG. 7 illustrates that positions of a first drive source M1 and a second drive source M2 are deviated to the right side from a position lower than a rotation shaft 42S of a separation roller 42 for ease of description. Further, FIG. 8 illustrates that the position of the first drive source M1 is deviated to the right side from the position lower than the rotation shaft 42S of the separation roller 42.

As illustrated in FIGS. 2, 3, 5 and 6, the opening and closing part 9 includes the conveyance guide 30 forming a part of the automatic conveyance mechanism 4, the supply tray 91 for supporting the sheet SH supplied to the conveyance guide 30, and a discharge tray 96 for supporting the sheet SH discharged from the conveyance guide 30.

As illustrated in FIG. 5, the supply tray 91 is positioned on the right side further than the first chute member 35, and is disposed above a right portion of the base member 39. The supply tray 91 includes the supply tray main body 92 and a movable plate 50. The supply tray main body 92 is gently inclined downward from a right end part side of the opening and closing part 9 to the left. The movable plate 50 is disposed to be adjacent to a left end part of the supply tray main body 92. The movable plate 50 extends in an approximately flat plate shape toward the regulation surface 35K of the first chute member 35. The movable plate 50 is covered with a right portion of the cover member 38 from above. The supply tray 91 supports the sheet SH supplied to the automatic conveyance mechanism 4 by the supply tray main body 92 and the movable plate 50.

As illustrated in FIG. 7, the movable plate 50 includes shaft units 50S and 50T having a third axis center X3 extending in the front and rear direction as an axis center.

The front shaft unit 50S is a cylindrical shaft protruding forward from a front and right corner part of the movable plate 50. The front shaft unit 50S is rotatably supported by the first side frame 9A. The rear shaft unit 50T is a cylindrical shaft protruding rearward from a rear and right corner part of the movable plate 50. The rear shaft unit 50T is rotatably supported by the second side frame 9B and protrudes rearward further than the second side frame 9B. Accordingly, the movable plate 50 is rotatable around the third axis center X3.

Figure 3:
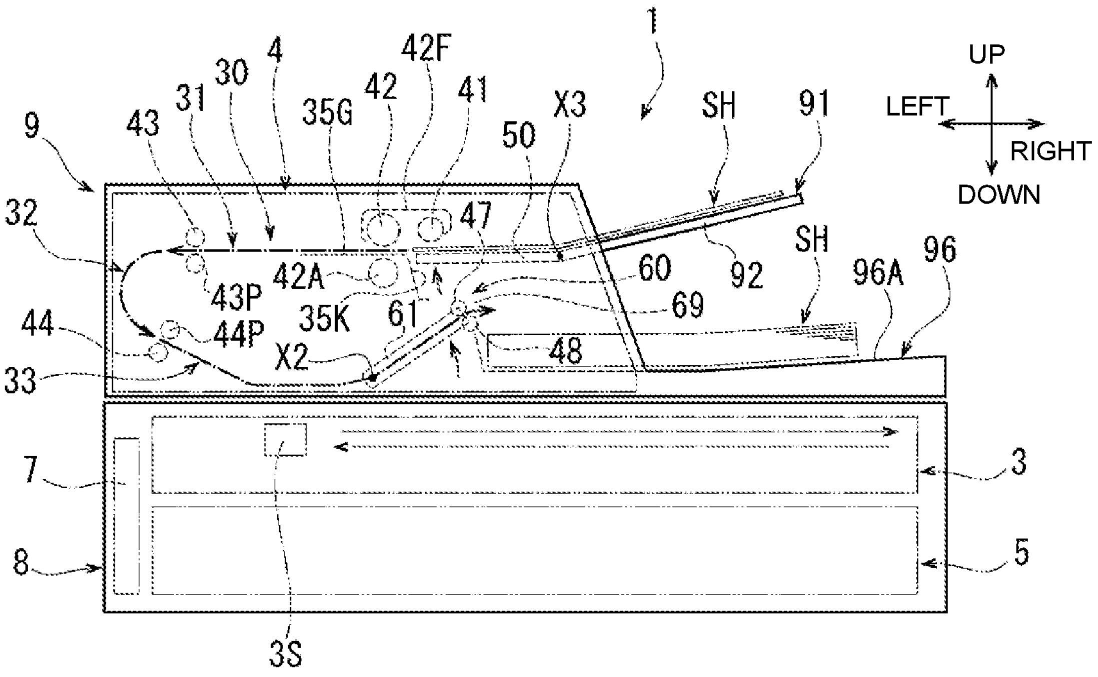
FIG. 3 is a schematic front view illustrating the image reading device according to the embodiment.

As will be described later in detail, the movable plate 50 is configured to rotate from a first position illustrated in FIGS. 2, 5, and 9 to a second position illustrated in FIGS. 3, 6, and 11 by operating the first drive source M1 and a first drive train 110 illustrated in FIGS. 7 and 9, and the like corresponding to the decrease of the sheets SH supported by the supply tray 91. The second position illustrated in FIG. 6 and the like is a position above the first position illustrated in FIG. 5 and the like.

As illustrated in FIGS. 1 and 5, two width regulation guides 94A and 94B are provided on the supply tray main body 92 to be respectively slidable in the front and rear direction. A plurality of types of the sheets SH having a different size supported by the supply tray 91 are sandwiched from the front side and the rear side in such a manner that the front width regulation guide 94A and the rear width regulation guide 94B approach each other or are separated from each other. Accordingly, the sheets SH having various sizes can be determined to be positioned based on a center part in a width direction of the supply tray 91 as a reference.

As illustrated in FIG. 5, the discharge tray 96 is formed on the right portion of the base member 39. That is, the discharge tray 96 is provided to be overlapped with the supply tray 91 at a position lower than the supply tray 91. In the discharge tray 96, an image is read out by the reading sensor 3S, and then the sheet SH conveyed by the automatic conveyance mechanism 4 is discharged. An upper surface of the discharge tray 96 is formed as a sheet supporting surface 96A for supporting the sheet SH to be discharged.

The conveyance guide 30 forms a conveyance path for conveying the sheet SH from the supply tray 91 toward the discharge tray 96. Specifically, the conveyance guide 30 includes a first guide 31, a second guide 32, and a third guide 33.

The first guide 31 is configured to include an approximately horizontally extending portion of the conveyance surface 35G of the first chute member 35 and an approximately horizontally extending portion of the guide surface 38G of the cover member 38. The first guide 31 guides the sheet SH to be sent out from the supply tray 91 to the left.

The second guide 32 is configured to include the curved left end part of the conveyance surface 35G of the first chute member 35; the curved left end part of the guide surface 38G of the cover member 38; the curved left end part of the conveyance surface 39G of the base member 39; and the curved left end part of the guide surface 36G of the second chute member 36. The second guide 32 is connected to the first guide 31 and changes the conveyance direction of the sheet SH from the left direction to the right direction.

The third guide 33 is configured to include a downwardly inclined portion of the conveyance surface 39G of the base member 39; a downwardly inclined portion of the guide surface 36G of the second chute member 36; and the guide surface 36H of the second chute member 36. The third guide 33 is connected to the second guide 32 and guides the sheet SH toward the discharge tray 96.

The automatic conveyance mechanism 4 includes a discharge unit 60 for discharging the sheet SH guided by the third guide 33 to the discharge tray 96. The discharge unit 60 is formed by unitizing a discharge guide 61, a discharge roller 47, and a discharge pinch roller 48.

A conveyance surface 61G and a guide surface 61H are formed in the discharge guide 61. The conveyance surface 61G is positioned on the right side further than the guide protruding unit 8H of the main body 8 and is inclined upward to the right. The guide surface 61H is positioned on the right side further than the guide surface 36H of the second chute member 36. The guide surface 61H is inclined upward to the right along the conveyance surface 61G. The discharge guide 61 includes a discharge opening 69 for discharging the sheet SH to the discharge tray 96. The discharge opening 69 is opened between a right end part of the conveyance surface 61G and a right end part of the guide surface 61H.

As illustrated in FIG. 7, in the discharge unit 60, the discharge guide 61 is an approximately angular cylindrical member in which a flat plate on which the conveyance surface 61G is formed and a flat plate on which the guide surface 61H is formed are opposite to each other in the up and down direction, and a front end edge and a rear end edge of the both flat plates are connected to each other by a pair of front and rear side plates. The discharge guide 61 includes shaft units 61S and 61T in which a second axis center X2 extending in the front and rear direction is set as an axis center. The second axis center X2 is parallel with the third axis center X3.

A front shaft unit 61S is a cylindrical shaft protruding forward from a front and left corner part of the conveyance surface 61G and the guide surface 61H. The front shaft unit 61S is rotatably supported by the first side frame 9A and protrudes forward further than the first side frame 9A.

The rear shaft unit 61T is a cylindrical shaft protruding rearward from a rear and left corner part of the conveyance surface 61G and the guide surface 61H. The rear shaft unit 61T is rotatably supported by the second side frame 9B, and protrudes rearward further than the second side frame 9B.

Accordingly, the discharge guide 61 is rotatable around the second axis center X2. As illustrated in FIG. 5, a position of the second axis center X2 is set to be overlapped with a conveyance path formed by the third guide 33 of the conveyance guide 30 and the discharge guide 61.

In the discharge unit 60, the discharge roller 47 is disposed above the discharge opening 69, and the discharge pinch roller 48 is disposed below the discharge opening 69. Although not illustrated herein, a plurality of sets of the discharge rollers 47 and discharge pinch rollers 48 are disposed to be spaced apart from each other in the front and rear direction.

The discharge roller 47 is fixed to a rotation shaft 47S having the first axis center X1 parallel with the second axis center X2 as an axis center. As illustrated in FIG. 7, a front end part of the rotation shaft 47S is rotatably supported at a front and right corner part of the discharge guide 61. A rear end part side of the rotation shaft 47S is rotatably supported at a rear and right corner part of the discharge guide 61. The rear end part of the rotation shaft 47S protrudes rearward further than the discharge guide 61. Accordingly, the discharge roller 47 is supported by the discharge guide 61 to be rotatable around the first axis center X1. The front and rear direction which is a direction in which the rotation shaft 47S of the discharge roller 47 extends is an example of “a shaft direction of the discharge roller”. While the position of the second axis center X2 is constant, a position of the first axis center X1 varies depending on the rotation of the discharge guide 61.

Figure 10:
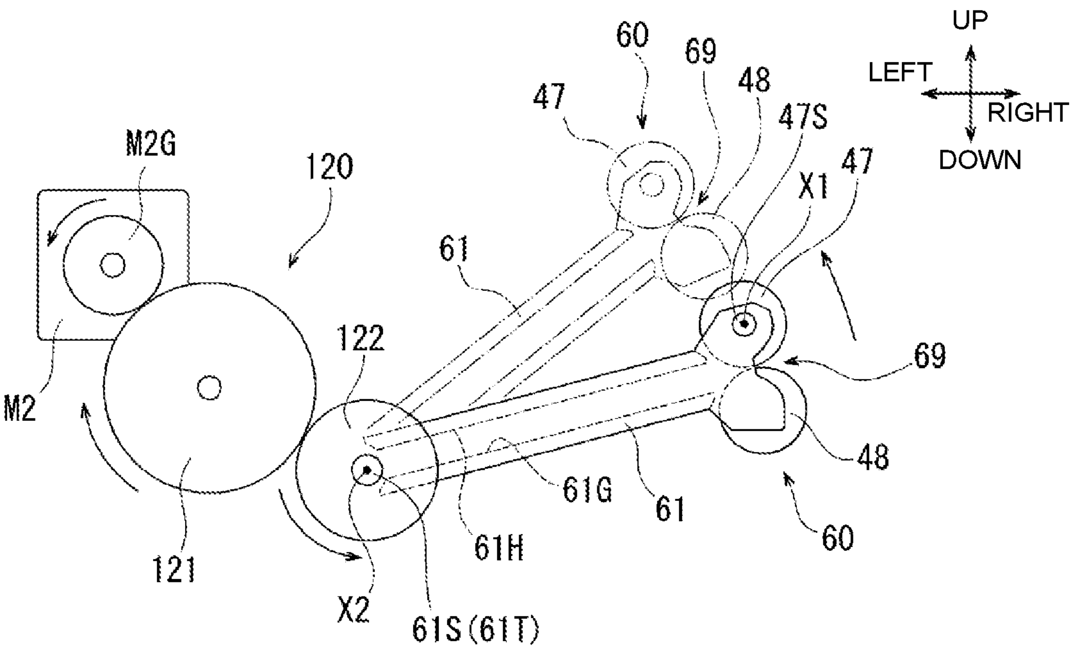
FIG. 10 is a schematic diagram illustrating a discharge unit, a second drive source, a second drive train when viewed from an arrow Y direction in FIG. 7.

As illustrated in FIGS. 5 and 10, the discharge pinch roller 48 is rotatably supported at a right end part of the discharge guide 61 and is opposite to the discharge roller 47 from below. The conveyance surface 61G and the guide surface 61H of the discharge guide 61 guide the sheet SH toward a nip position between the discharge roller 47 and the discharge pinch roller 48.

As will be described later in detail, the discharge unit 60 is configured to rotate from a third position illustrated in FIGS. 2 and 5 to a fourth position illustrated in FIGS. 3 and 6 by operating the second drive source M2 and a second drive train 120 illustrated in FIGS. 7 and 10 corresponding to the decrease of the sheets( ) SH supported by the supply tray 91. A position of the discharge unit 60 indicated by a solid line in FIG. 10 is the third position. A position of the discharge unit 60 indicated by a two-dot chain line in FIG. 10 is the fourth position. The fourth position illustrated in FIG. 6, and the like is a position higher than the third position illustrated in FIG. 5 and the like.

As illustrated in FIG. 5, the automatic conveyance mechanism 4 includes a supply roller 41, the separation roller 42, a retard roller 42A, a first conveyance roller 43, a first pinch roller 43P, a second conveyance roller 44, a second pinch roller 44P, the discharge roller 47, and the discharge pinch roller 48 for conveying the sheet SH along the conveyance guide 30.

The supply roller 41, the separation roller 42, the first conveyance roller 43, and the second conveyance roller 44 are an example of “the conveyance roller” of the present disclosure. The discharge roller 47 and the discharge pinch roller 48 are a part of the discharge unit 60 described above.

As illustrated in FIG. 7, the rotation shaft 42S of the separation roller 42, a rotation shaft 43S of the first conveyance roller 43, and a rotation shaft 44S of the second conveyance roller 44 are rotatably supported by the first side frame 9A and the second side frame 9B. Respective rear end parts of the rotation shafts 42S, 43S, and 44S protrude rearward further than the second side frame 9B.

<Configuration of First Drive Source and Second Drive Source>

The automatic conveyance mechanism 4 includes the first drive source M1 illustrated in FIGS. 4 to 9 and FIG. 11, and the second drive source M2 illustrated in FIGS. 4 to 7 and FIG. 10. As illustrated in FIG. 5, the first drive source M1 and the second drive source M2 are disposed between the first guide 31 and the third guide 33.

As illustrated in FIG. 7, the first drive source M1 is mounted on a surface facing a front side of the second side frame 9B. A drive shaft of the first drive source M1 protrudes rearward further than the second side frame 9B, and a drive gear M1G is fixed to the drive shaft thereof. In the embodiment, the first drive source M1 is a stepping motor. The first drive source M1 generates a drive force by being controlled by the controller 7, thereby rotating the drive gear M1G clockwise and counter-clockwise in FIG. 8 and the like.

As illustrated in FIG. 7, the second drive source M2 is mounted on a surface facing a rear side of the first side frame 9A. A drive shaft of the second drive source M2 protrudes forward further than the first side frame 9A, and a drive gear M2G is fixed to the drive shaft thereof. In the embodiment, the second drive source M2 is a stepping motor. The second drive source M2 generates a drive force by being controlled by the controller 7, thereby rotating the drive gear M2G clockwise and counter-clockwise in FIG. 10.

<Configuration of Third Drive Train and Fourth Drive Train>

As illustrated in FIGS. 7 and 8, the automatic conveyance mechanism 4 includes a third drive train 130 for transmitting a drive force from the first drive source M1 to the discharge roller 47, and a fourth drive train 140 for transmitting the drive force from the first drive source M1 to the supply roller 41, the separation roller 42, the first conveyance roller 43 and the second conveyance roller 44. As illustrated in FIG. 7, the third drive train 130 and the fourth drive train 140 are disposed rearward further than the second side frame 9B and are supported by a plurality of shaft units protruding rearward from the second side frame 9B.

Further, in the embodiment, with respect to each gear forming the third drive train 130 and the fourth drive train 140, illustration of gear teeth formed on the outer peripheral surface is omitted in FIGS. 7 and 8. A plurality of arrows illustrated in FIG. 8 indicate a rotation direction when the drive gear M1G rotates clockwise in FIG. 8 and a second electromagnetic clutch C2 is in a connected state.

As illustrated in FIGS. 7 and 8, the fourth drive train 140 includes a gear 141, the second electromagnetic clutch C2, a gear 142, a gear 143, and a plurality of gear groups 144G.

The gear 141 is positioned on the left side and upward with respect to the drive gear M1G and is engaged with the drive gear M1G The gear 141 is connected to an input side of the second electromagnetic clutch C2. The gear 142 is connected to an output side of the second electromagnetic clutch C2.

The second electromagnetic clutch C2 includes a solenoid, which is not illustrated, controlled and moved by the controller 7, and a clutch mechanism, which is not illustrated, switched between a connected state and a cut-off state by the action of the solenoid. As the clutch mechanism, it is possible to use a well-known clutch mechanism having a configuration in which clutch plates are in contact with each other or separated from each other, and a configuration in which the rotation of a part of a gear group including a planetary gear is allowed or regulated, and the like.

The gear 143 is positioned upward with respect to the gear 142 and is engaged with the gear 142. The plurality of gear groups 144G includes gears 144G1, 144G2, 144G3, and 144G4. The gear 144G1 is engaged with the gear 143.

The first drive source M1 rotates the drive gear M1G clockwise in FIG. 8, and the drive force from the first drive source M1 is transmitted to the gear 144G1 via the gear 141, the second electromagnetic clutch C2 and the gears 142 and 143 in the connected state, whereby the gear 144G1 rotates integrally with the rotation shaft 42S of the separation roller 42. The gear 144G2 rotates integrally with the rotation shaft 43S of the first conveyance roller 43 by transmitting the drive force from the gear 144G1 via the gear 144G4. The gear 144G3 rotates integrally with the rotation shaft 44S of the second conveyance roller 44 by transmitting the drive force from the gear 144G1 via the gear 144G4. Further, when the jammed sheet SH in the conveyance guide 30 is removed, the second electromagnetic clutch C2 is put into the cut-off state, whereby the gears 144G1, 144G2 and 144G3 become free to rotate. As a result, the jammed sheet SH can be easily removed.

The plurality of gear groups 144G transmit the drive force from the first drive source M1 to the rotation shaft 42S of the separation roller 42, the rotation shaft 43S of the first conveyance roller 43, and the rotation shaft 44S of the second conveyance roller 44 to rotate the separation roller 42, the first conveyance roller 43, and the second conveyance roller 44 in a direction in which the sheet SH is conveyed toward the reading sensor 3S which is stopped at a stationary reading position, that is, counter-clockwise in FIG. 8.

As illustrated in FIGS. 7 and 8, the third drive train 130 includes a gear 131, a gear 132, a pulley 133, a timing belt 134, and a pulley 135.

The gear 131 is positioned on the right side with respect to the drive gear M1G and is engaged with the drive gear M1G The gear 132 is positioned on the right side and downward with respect to the gear 131 and is engaged with the gear 131. The gear 132 and the pulley 133 are formed as one member. The pulley 133 is disposed on the rear side of the gear 132. The gear 132 and the pulley 133 are inserted into the shaft unit 61T on the rear side of the discharge guide 61 to be rotatable independently. The pulley 133 is rotatable around the second axis center X2 integrally with the gear 132.

The pulley 135 is fixed to the rear end part of the rotation shaft 47S of the discharge roller 47. The pulley 135 is rotatable around the first axis center X1 together with the rotation shaft 47S of the discharge roller 47. The timing belt 134 is wound around the pulley 133 and the pulley 135. The timing belt 134 transmits the drive force of the first drive source M1 from the pulley 133 to the pulley 135.

The controller 7 performs a first drive operation in which the discharge roller 47 is rotated by operating the first drive source M1 and the third drive train 130. Further, when performing the first drive operation, the controller 7 stops a second drive operation which will be described later.

That is, when the first drive source M1 rotates the drive gear M1G clockwise in FIG. 8 by the control of the controller 7, the gears 131 and 132, the pulley 133, the timing belt 134, and the pulley 135 of the third drive train 130 transmit the drive force from the first drive source M1 to the rotation shaft 47S of the discharge roller 47. Accordingly, the discharge roller 47 rotates in a direction in which the sheet SH is discharged through the discharge opening 69 to the discharge tray 96, that is, clockwise in FIG. 8.

A gap between the second axis center X2 of the pulley 133 and the first axis center X1 of the pulley 135 does not change even though the discharge guide 61 rotates. Therefore, even though the discharge guide 61 rotates, tension of the timing belt 134 hardly fluctuates, whereby the drive force can be appropriately transmitted from the pulley 133 to the pulley 135.

<Schematic Configurations of Supply Roller, Separation Roller, First and Second Conveyance Rollers, and the Like>

As illustrated in FIG. 5, the separation roller 42 is disposed at a position deviated to the left side further than the connection part between the regulation surface 35K and the conveyance surface 35G in the first chute member 35.

A holder 42F is rotatably supported in the rotation shaft 42S of the separation roller 42. The holder 42F protrudes on the right side to be separated from the rotation shaft 42S and to exceed the regulation surface 35K.

The supply roller 41 is rotatably held at a right end part of the holder 42F. The supply roller 41 is provided at a position opposite to the movable plate 50 from above. The rotation shaft 42S and a transmission gear group, which is not illustrated, provided in the holder 42F transmit the drive force from the first drive source M1 to the supply roller 41, thereby rotating the supply roller 41 in a direction in which the sheet SH supported by the supply tray 91 is sent out to the conveyance guide 30. The supply roller 41 can be displaced in the up and down direction depending on the rotation of the holder 42F.

A holder posture detection sensor 42J is provided in the opening and closing part 9. The holder posture detection sensor 42J detects whether or not a posture of the holder 42F is an appropriate posture illustrated in FIGS. 5 and 6, and then transmits the detected posture to the controller 7. In a state where the holder 42F is in the appropriate posture illustrated FIGS. 5 and 6, a lower end of the supply roller 41 has approximately the same height as that of the conveyance surface 35G of the first chute member 35. In this state, the supply roller 41 can appropriately send out the uppermost sheet SH among the sheets SH supported by the supply tray 91 toward the conveyance surface 35G, that is, toward a space between the separation roller 42 and the retard roller 42A.

The retard roller 42A is supported by the first chute member 35 at a position just below the separation roller 42 and is pressed against the separation roller 42. When there exists one sheet SH to be nipped by the separation roller 42 and the retard roller 42A, rotation of the retard roller 42A is allowed by a torque limiter which is not illustrated. On the other hand, when there exist a plurality of sheets SH to be nipped by the separation roller 42 and the retard roller 42A, the rotation of the retard roller 42A is stopped by the torque limiter which is not illustrated. As a result, the retard roller 42A applies a force for stopping the conveyance of the sheet SH with respect to the sheet SH other than the sheet SH in contact with the separation roller 42.

The first conveyance roller 43 is disposed at a connection part between the first guide 31 and the second guide 32 to be opposite to the conveyance surface 35G of the first chute member 35 from above. The first pinch roller 43P is supported by the first chute member 35 and is pressed against the first conveyance roller 43. The first conveyance roller 43 and the first pinch roller 43P nip the sheet SH which is separated one by one by the separation roller 42 and the retard roller 42A, and then convey the nipped sheet SH toward the second guide 32.

The second conveyance roller 44 is disposed at a connection part between the second guide 32 and the third guide 33 to be opposite to the guide surface 36G of the second chute member 36 from below. The second pinch roller 44P is supported by the second chute member 36 and is pressed against the second conveyance roller 44. The second conveyance roller 44 and the second pinch roller 44P nip the sheet SH which is conveyed by the first conveyance roller 43 and the first pinch roller 43P, and then convey the nipped sheet SH toward the reading surface 8B, that is, toward the reading sensor 3S which is stopped at the stationary reading position.

The discharge roller 47 and the discharge pinch roller 48 nip the sheet SH which passes over the reading surface 8B and is guided by the discharge guide 61, after which the nipped sheet SH is discharged through the discharge opening 69 toward the discharge tray 96.

<Configuration of First Drive Train>

Figure 9:
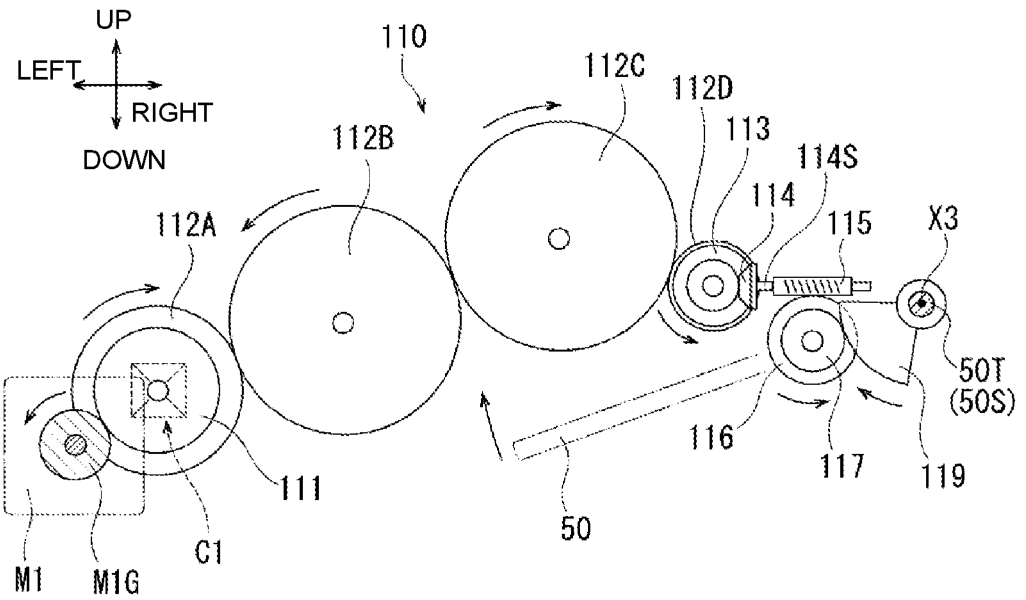
FIG. 9 is a schematic diagram illustrating a movable plate, the first drive source, a first drive train, and the like when viewed from an arrow W direction in FIG. 7, and is a diagram illustrating a state in which the movable plate is disposed at a first position.
Figure 11:
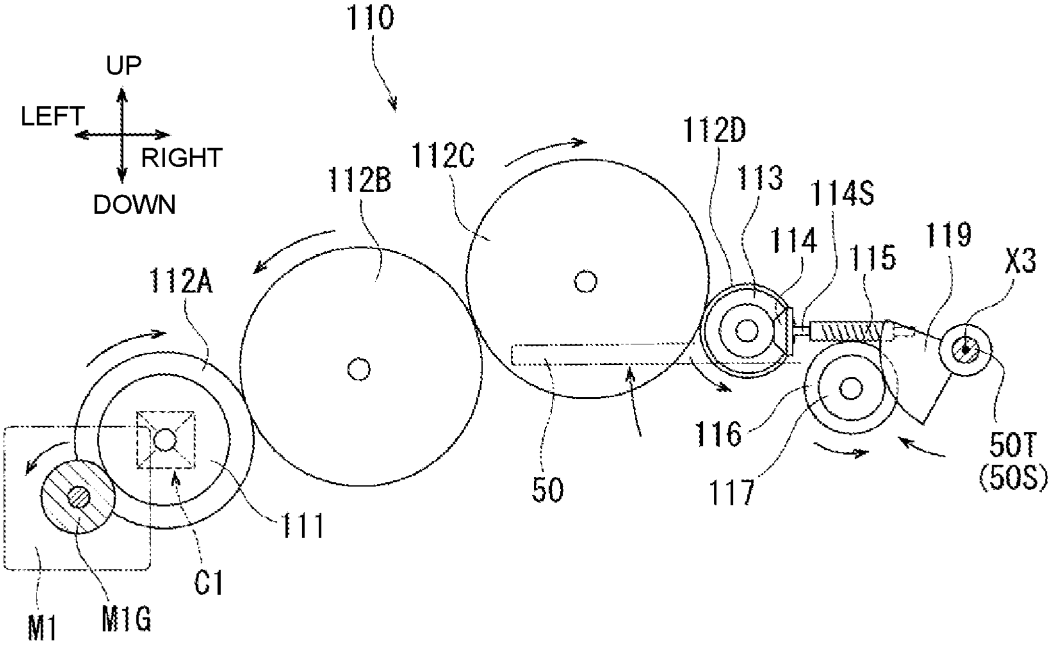
FIG. 11 is a schematic diagram same as that of FIG. 9, and is a diagram illustrating a state in which the movable plate moves to a second position.

As illustrated in FIGS. 7, 9, and 11, the automatic conveyance mechanism 4 includes the first drive train 110 for rotating the movable plate 50 by transmitting the drive force from the first drive source M1 to the movable plate 50. Further, in the embodiment, with respect to each gear forming the first drive train 110, illustration of gear teeth formed on the outer peripheral surface is omitted in FIGS. 7 and 9, and the like.

A plurality of arrows illustrated in FIGS. 9 and 11 indicate a rotation direction when the drive gear M1G rotates counter-clockwise in FIGS. 9 and 11. Further, when the drive gear M1G rotates clockwise in FIGS. 9 and 11, the rotation direction becomes a rotation direction opposite to each arrow illustrated in FIGS. 9 and 11.

As illustrated in FIG. 7, the first drive train 110 is disposed rearward further than the second side frame 9B and the third drive train 130, and is disposed forward further than the third side frame 9C. The first drive train 110 is supported by the plurality of shaft units and the like protruding forward further than the third side frame 9C.

As illustrated in FIGS. 7 and 9, the first drive train 110 includes a gear 111, the first electromagnetic clutch C1, a gear 112A, a gear 112B, a gear 112C, a gear 112D, a bevel gear 113, a bevel gear 114, a worm 115, a worm wheel 116, a gear 117, and a fan shaped gear 119. The first electromagnetic clutch C1 is an example of "the electromagnetic clutch provided in the first drive train".

The gear 111 is positioned on the right side and upward with respect to the drive gear M1G and is engaged with the drive gear M1G The gear 111 is connected to an input side of the first electromagnetic clutch C1. The gear 112A is connected to an output side of the first electromagnetic clutch C1.

The first electromagnetic clutch C1 includes the solenoid, which is not illustrated, controlled and moved by the controller 7, and the clutch mechanism, which is not illustrated, switched between the connected state and the cut-off state by the action of the solenoid. A configuration of the clutch mechanism is the same as that of the second electromagnetic clutch C2.

The gear 112B is positioned on the right side and upward with respect to the gear 112A and is engaged with the gear 112A. The gear 112C is positioned on the right side and upward with respect to the gear 112B and is engaged with the gear 112B. The gear 112D is positioned on the right side and downward with respect to the gear 112C and is engaged with the gear 112C.

The gear 112D and the bevel gear 113 are formed as one member. The bevel gear 113 is disposed on a front side of the gear 112D. A rotation shaft 114S of the bevel gear 114 extends in the left and right direction orthogonal to a rotation shaft of the bevel gear 113. The bevel gear 114 is positioned on the right side and forward with respect to the bevel gear 133 and is engaged with the bevel gear 113.

The worm 115 is fixed to the rotation shaft 114S extending to the right side from the bevel gear 114, and is rotatable integrally with the bevel gear 114. The worm wheel 116 and the gear 117 are formed as one member. Rotation shafts of the worm wheel 116 and the gear 117 extend in the front and rear direction in parallel with the third axis center X3. The worm wheel 116 is positioned below the worm 115 and is engaged with the worm 115. The gear 117 is disposed on a front side of the worm wheel 116 and has a diameter smaller than that of the worm wheel 116.

The fan shaped gear 119 is fixed to the shaft unit 50T on a rear side of the movable plate 50. The fan shaped gear 119 is positioned on the right side with respect to the gear 117 and is engaged with the gear 117. When the fan shaped gear 119 rotates, the movable plate 50 rotates integrally with the fan shaped gear 119.

The controller 7 performs a third drive operation in which the movable plate 50 is rotated between the first position illustrated in FIG. 5 and the like and the second position illustrated in FIG. 6 and the like in such a manner that the first electromagnetic clutch C1 is switched from the cut-off state to the connected state, thereby operating the first drive source M1 and the first drive train 110.

That is, when the first electromagnetic clutch C1 is in the cut-off state by the control of the controller 7, even though the movable plate 50 attempts to fall down by the own weight thereof, a force at that time is transmitted to the worm 115 and the worm wheel 116, whereby the worm 115 and the worm wheel 116 are self-locked. Therefore, the movable plate 50 that is connected to the first electromagnetic clutch C1 via the worm 115 and the worm wheel 116 does not fall down, and is maintained at the position.

Next, when the first drive source M1 rotates the drive gear M1G counter-clockwise in FIG. 9 and the first electromagnetic clutch C1 is further in the connected state by the control of the controller 7, the first drive train 110 transmits the drive force from the first drive source M1 to the movable plate 50 by the operation of the gears 112A to 112D, the bevel gears 113 and 114, the worm 115, the worm wheel 116, the gear 117, and the fan shaped gear 119. Accordingly, as illustrated in FIG. 11, the movable plate 50 rotates around the third axis center X3 to displace a left end part thereof upward, and then moves from the first position illustrated in FIG. 5 and the like to the second position illustrated in FIG. 6 and the like.

On the other hand, when the first drive source M1 rotates the drive gear M1G clockwise in FIG. 11 and the first electromagnetic clutch C1 is further in the connected state by the control of the controller 7, the first drive train 110 transmits the drive force from the first drive source M1 to the movable plate 50 by the operation of the gears 112A to 112D, the bevel gears 113 and 114, the worm 115, the worm wheel 116, the gear 117, and the fan shaped gear 119 in an opposite direction. Accordingly, as illustrated in FIG. 9, the movable plate 50 rotates around the third axis center X3 to displace the left end part thereof downward, and then moves from the second position illustrated in FIG. 6 and the like to the first position illustrated in FIG. 5 and the like.

<Configuration of Second Drive Train>

As illustrated in FIGS. 7 and 10, the automatic conveyance mechanism 4 includes the second drive train 120 for rotating the discharge unit 60 by transmitting the drive force from the second drive source M2 to the discharge unit 60. Further, in the embodiment, with respect to each gear forming the second drive train 120, illustration of gear teeth formed on the outer peripheral surface is omitted in FIGS. 7 and 10.

A plurality of arrows illustrated in FIG. 10 indicate a rotation direction when the drive gear M2G rotates counter-clockwise in FIG. 10. Further, when the drive gear M2G rotates clockwise in FIG. 10, the rotation direction becomes a rotation direction opposite to each arrow illustrated in FIG. 10.

As illustrated in FIG. 7, the second drive train 120 is disposed forward further than the first side frame 9A and is supported by the plurality of shaft units protruding forward from the first side frame 9A.

As illustrated in FIGS. 7 and 10, the second drive train 120 includes a gear 121 and a gear 122. The gear 121 is positioned on the right side and downward with respect to the drive gear M2G and is engaged with the drive gear M2G The gear 122 is fixed to the shaft unit 61S in front of the discharge guide 61 to be integrally rotatable. The gear 122 is positioned on the right side and downward with respect to the gear 121 and is engaged with the gear 121. When the gear 122 rotates, the discharge guide 61, and the discharge roller 47 and the discharge pinch roller 48 supported by the discharge guide 61 rotate integrally with the gear 122.

The controller 7 performs the second drive operation for rotating the discharge unit 60 between the third position illustrated in FIG. 5 and the like, and the fourth position illustrated in FIG. 6 and the like by operating the second drive source M2 and the second drive train 120. Further, when performing the second drive operation, the controller 7 stops the first drive operation described above.

That is, when the second drive source M2 rotates the drive gear M2G counter-clockwise in FIG. 10 by the control of the controller 7, the second drive train 120 transmits the drive force from the second drive source M2 to the discharge unit 60 by the operation of the gears 121 and 122. Accordingly, as indicated by the two-dot chain line in FIG. 10, since the discharge guide 61 rotates upward integrally with the gear 122, the discharge unit 60 rotates around the second axis center X2 to displace the discharge opening 69 upward, and then moves to the fourth position illustrated in FIG. 6 and the like.

Further, when the second drive source M2 rotates the drive gear M2G clockwise in FIG. 10 by the control of the controller 7, the second drive train 120 transmits the drive force from the second drive source M2 to the discharge unit 60 by the operation of the gears 121 and 122 in an opposite direction. Accordingly, as indicated by the solid line in FIG. 10, since the discharge guide 61 rotates downward integrally with the gear 122, the discharge unit 60 rotates around the second axis center X2 to displace the discharge opening 69 downward, and then moves to the third position illustrated in FIG. 5 and the like.

Since the second drive source M2 is only required to generate the drive force for rotating the discharge unit 60, as illustrated in FIG. 7, it is possible to adopt a small-sized one having a smaller output than that of the first drive source M1.

As illustrated in FIG. 5, when the movable plate 50 is at the first position, a left end part of the movable plate 50 is at a position opposite to a lower end part of the regulation surface 35K of the first chute member 35, and an inclination angle of an upper surface of the movable plate 50 is approximately the same as an inclination angle of an upper surface of the supply tray main body 92. In this state, the supply tray 91 can support the sheets SH with the maximum number of stacked sheets. When the movable plate 50 is at the first position and the supply roller 41 abuts on the uppermost sheet SH of the maximum number of stacked sheets SH, the posture of the holder 42F becomes the appropriate posture illustrated in FIG. 5.

As illustrated in FIG. 6, when the movable plate 50 is at the second position, the left end part of the movable plate 50 is at a position opposite to the upper end part of the regulation surface 35K of the first chute member 35, and the upper surface of the movable plate 50 is in a state of being extended approximately horizontally at the same height as that of the conveyance surface 35G of the first chute member 35. In this state, the supply tray 91 supports about one to several number of the sheets SH. When the movable plate 50 is at the second position and the supply roller 41 abuts on the uppermost sheet SH of the one to several number of the sheets SH, the posture of the holder 42F becomes the appropriate posture illustrated in FIG. 6.

When it is determined that the posture of the holder 42F is in a state of descending beyond an allowable range from the appropriate posture illustrated in FIGS. 5 and 6 based on a detection signal of the holder posture detection sensor 42J, the controller 7 performs the third drive operation. That is, the controller 7 operates the first drive source M1 and the first drive train 110, and then rotates the movable plate 50 little by little from the first position illustrated in FIG. 5 and the like toward the second position illustrated in FIG. 6 and the like, whereby the holder 42F is controlled to maintain the appropriate posture illustrated in FIGS. 5 and 6. At this time, it is possible to determine a position of the movable plate 50 in a desired rotation posture with high accuracy by finely changing a rotation posture of the fan shaped gear 119 by rotation angle control of the first drive source M1 which is the stepping motor.

The controller 7 appropriately performs the second drive operation according to the small rotation of the movable plate 50. That is, the controller 7 rotates the discharge unit 60 little by little from the third position illustrated in FIG. 5 and the like toward the fourth position illustrated in FIG. 6 and the like by operating the second drive source M2 and the second drive train 120. Further, when the second drive operation is performed, the controller 7 stops the first drive operation for rotating the discharge roller 47 by setting the first drive source M1 in an inoperative state, and when the first drive operation is performed, the controller 7 stops the second drive operation by setting the second drive source M2 in an inoperative state.

The image reading device 1 achieves reducing its size in the up and down direction by a configuration in which the discharge unit 60 rotates according to the rotation of the movable plate 50 of the supply tray 91.

As illustrated in FIG. 5, when the discharge unit 60 is at the third position, the discharge opening 69, the discharge roller 47, and the discharge pinch roller 48 are at positions close to the sheet supporting surface 96A of the discharge tray 96. A state of the discharge unit 60 corresponds to a case in which the number of sheets SH supported by the sheet supporting surface 96A of the discharge tray 96 is small.

As illustrated in FIG. 6, when the discharge unit 60 is at the fourth position, the discharge opening 69, the discharge roller 47, and the discharge pinch roller 48 are at positions separated upward from the sheet supporting surface 96A of the discharge tray 96. A state of the discharge unit 60 corresponds to a case in which the sheets SH are supported by the sheet supporting surface 96A of the discharge tray 96 with the maximum number of stacked sheets. In other words, in this state, the discharge opening 69 of the discharge unit 60 is sufficiently separated upward from the uppermost sheet SH of the sheets SH supported by the sheet supporting surface 96A with the maximum number of stacked sheets.

<Image Reading Operation>

In the image reading device 1, when reading an image on a document supported by the document supporting surface 8A, the controller 7 operates the scanning mechanism, which is not illustrated, by controlling the scanning mechanism drive source 3M of the reading unit 3, and then moves the reading sensor 3S in the left and right direction from a reading start position below a left end edge of the document supporting surface 8A to a reading end position below a right end edge thereof. Accordingly, the reading sensor 3S reads the image on the document supported by the document supporting surface 8A. Thereafter, the controller 7 operates the scanning mechanism, which is not illustrated, in a reverse direction by controlling the scanning mechanism drive source 3M of the reading unit 3, and then moves the reading sensor 3S which completes the reading from a right end to a left end in the reading unit 3, thereby returning the reading sensor 3S to a standby position.

Further, in the image reading device 1, the sheet SH supported by the supply tray 91 is conveyed by the automatic conveyance mechanism 4; when reading the image on the sheet SH, the controller 7 operates the scanning mechanism, which is not illustrated, by controlling the scanning mechanism drive source 3M of the reading unit 3; and the reading sensor 3S is stopped at the stationary reading position below the reading surface 8B. Here, it is assumed that the movable plate 50 is at the first position illustrated in FIG. 5 and the like, the discharge unit 60 is at the third position illustrated in FIG. 5 and the like, and the sheet SH is in a state of not being supported by the discharge tray 96.

Next, the controller 7 determines whether or not the holder posture detection sensor 42J is in the appropriate posture illustrated in FIGS. 5 and 6 based on the detection signal of the holder posture detection sensor 42J. When the holder posture detection sensor 42J is not in the appropriate posture illustrated in FIGS. 5 and 6, the controller 7 operates the third drive operation, and then rotates the movable plate 50 little by little from the first position illustrated in FIG. 5 and the like to the second position illustrated in FIG. 6 and the like, thereby controlling the holder 42F to maintain the appropriate posture illustrated in FIGS. 5 and 6.

Further, the controller 7 appropriately performs the second drive operation according to the small rotation of the movable plate 50, and then rotates the discharge unit 60 little by little from the third position illustrated in FIG. 5 and the like toward the fourth position illustrated in FIG. 6 and the like. At this time, the controller 7 stops the first drive operation for rotating the discharge roller 47 by setting the first drive source M1 in the inoperative state.

Next, the controller 7 performs the first drive operation and operates the first drive source M1, the third drive train 130, and the fourth drive train 14 by setting the second electromagnetic clutch C2 in the connected state. At this time, the controller 7 stops the second drive operation for rotating the discharge unit 60 between the third position illustrated in FIG. 5 and the like and the fourth position illustrated in FIG. 6 and the like by setting the second drive source M2 in the inoperative state.

Accordingly, the controller 7 drives the supply roller 41, the separation roller 42, the first conveyance roller 43, the second conveyance roller 44, and the discharge roller 47, and then supplies the sheet SH supported by the supply tray 91 to the conveyance guide 30 to sequentially convey the supplied sheet SH along the conveyance guide 30. When the conveyed sheet SH passes over the reading surface 8B, the controller 7 reads the image on the conveyed sheet SH by the reading sensor 3S which is stopped at the stationary reading position. Next, the controller 7 discharges the sheet SH whose image is read out through the discharge opening 69 toward the discharge tray 96 by the discharge guide 61, the discharge roller 47, and the discharge pinch roller 48 of the discharge unit 60.

Meanwhile, the controller 7 performs the third drive operation according to the decrease of the sheets SH supported by the supply tray 91 based on the detection signal of the holder posture detection sensor 42J, thereby rotating the movable plate 50 little by little toward the second position illustrated in FIG. 6 and the like. Further, the controller 7 appropriately performs the second drive operation according to the small rotation of the movable plate 50, thereby rotating the discharge unit 60 little by little toward the fourth position illustrated in FIG. 6 and the like. At this time, the controller 7 stops the first drive operation for rotating the discharge roller 47 by setting the first drive source M1 in the inoperative state.

As illustrated in FIG. 6, when the number of sheets SH supported by the supply tray 91 decreases and further the sheet SH runs out, the controller 7 stops the first drive source M1, thereby terminating the image reading operation.

Thereafter, the controller 7 operates the scanning mechanism, which is not illustrated, by controlling the scanning mechanism drive source 3M of the reading unit 3, and then returns the reading sensor 3S to the standby position. Further, after a detection means which is not illustrated confirms that the sheet SH is not supported by the discharge tray 96, the controller 7 performs the second drive operation and the third drive operation, returns the movable plate 50 to the first position illustrated in FIG. 5 and the like, and returns the discharge unit 60 to the third position illustrated in FIG. 5 and the like.

<Advantages>

In the image reading device 1 of the embodiment, when performing the second drive operation for rotating the discharge unit 60 between the third position illustrated in FIG. 5 and the like and the fourth position illustrated in FIG. 6 and the like, the controller 7 stops the first drive operation for rotating the discharge roller 47 by setting the first drive source M1 in the inoperative state, and when performing the first drive operation, the controller 7 stops the second drive operation by setting the second drive source M2 in the inoperative state.

That is, when the discharge roller 47 is stopped and the reading sensor 3S does not perform the reading operation, the discharge guide 61 rotates. Further, when the discharge guide 61 is stopped, the discharge roller 47 rotates and the reading sensor 3S performs the reading operation. At this time, since the sheet SH in contact with the discharge roller 47 is hardly influenced by the discharge guide 61 which is stopped, a conveyance speed of the sheet SH can be prevented from fluctuating.

Therefore, in the image reading device 1 of the embodiment, it is possible to prevent reading accuracy of the reading sensor 3S from deteriorating.

Further, in the image reading device 1, the controller 7 performs the third drive operation for rotating the movable plate 50 between the first position illustrated in FIG. 5 and the like and the second position illustrated in FIG. 6 and the like by operating the first drive source M1 and the first drive train 110 illustrated in FIG. 9 and the like. Further, the controller 7 performs the second drive operation for rotating the discharge unit 60 between the third position illustrated in FIG. 5 and the like and the fourth position illustrated in FIG. 6 and the like by operating the second drive source M2 and the second drive train 120 illustrated in FIG. 10 and the like.

According to the above-mentioned configuration, since the controller 7 can separately control a rotation timing of the movable plate 50 and a rotation timing of the discharge guide 61, it is possible to improve a degree of freedom of the control for rotating the movable plate 50 and the discharge guide 61. For example, the movable plate 50 rotates little by little regardless of the rotation and stop of the discharge roller 47 (execution and stop of the reading operation by the reading sensor 3S), however, it can be easily achieved to control the discharge guide 61 to rotate only when the discharge roller 47 is stopped (when the reading operation by the reading sensor 3S is stopped).

Further, in the image reading device 1, as illustrated in FIG. 7 and the like, it is possible to perform the rotation drive of the supply roller 41, the separation roller 42, the first conveyance roller 43, and the second conveyance roller 44; the rotation drive of the discharge roller 47; and the drive for rotating the movable plate 50 by the single first drive source M1, and the first drive train 110, the third drive train 130 and the fourth drive train 140 which are respectively connected to the first drive source M1. As a result, it is possible to achieve the reduction of manufacturing cost. Further, according to the configuration, since the second drive source M2 is only required to generate the drive force for rotating the discharge unit 60, a small-sized one having a smaller output than that of the first drive source M1 can be adopted. As a result, the manufacturing cost can be further reduced.

Further, in the image reading device 1, the controller 7 performs the third drive operation in such a manner that the first electromagnetic clutch C1 is switched from the cut-off state to the connected state, thereby operating the first drive source M1 and the first drive train 110. According to the configuration, the rotation timing of the movable plate 50 can be controlled by disconnecting the first electromagnetic clutch C1 when the discharge roller 47 is driven to rotate. As a result, a degree of freedom of the rotation timing of the movable plate 50 can be improved.

Further, in the image reading device 1, as illustrated in FIG. 7, the second drive train 120 is provided on the side of the first side frame 9A, and the first drive train 110, the third drive train 130, and the fourth drive train 140 are provided on the side of the second side frame 9B. According to the configuration, the number of components disposed on the side of the first side frame 9A can be reduced, and thus, an occupied space on the side of the first side frame 9A can be reduced.

As described above, the present disclosure is described according to the embodiment, but the present disclosure is not limited to the embodiment, and it goes without saying that the present disclosure can be applied by being appropriately modified within the scope not deviated from the gist thereof.

In the embodiment, the movable plate 50 is configured to rotate, but is not limited to this configuration, and for example, the movable plate 50 may be linearly moved. The same also applies to the discharge unit.

INDUSTRIAL APPLICABILITY

For example, the configuration according to the present disclosure may be implemented in an image reading device or a multifunction machine, and the like.

As described in the above with reference to the exemplary embodiment, according to the present disclosure, there is provided an image reading device including: a supply tray configured to support a sheet to be supplied, the support tray including a movable plate that is configured to move from a first position to a second position according to a decrease in the number of the sheet to be supported by the supply tray, the second position being higher than the first position; a discharge tray positioned below the supply tray, the discharge tray being configured to support the sheet to be discharged; a conveyance guide configured to convey the sheet from the supply tray to the discharge tray; a reading sensor which reads an image on the sheet to be conveyed on the conveyance guide; a discharge guide including a discharge opening for discharging the sheet conveyed by the conveyance guide to the discharge tray, the discharge guide being configured to be movable from a third position to a fourth position a according to the decrease in the number of the sheet to be supported by the supply tray, the fourth position being higher than the third position; a discharge roller configured to discharge the sheet through the discharge opening; and a controller that operates to perform a first drive operation for rotating the discharge roller, and a second drive operation for moving the discharge guide between the third position and the fourth position, wherein the controller is configured to stop the first drive operation when performing the second drive operation, and stop the second drive operation when performing the first drive operation.

Advantageous Effects

In the image reading device of the present disclosure, by the controller including the above-mentioned configuration, when the discharge roller is stopped and the reading sensor does not perform the reading operation, the discharge guide moves. Further, when the discharge guide is stopped, the discharge roller rotates and the reading sensor performs the reading operation. At this time, since a sheet in contact with the discharge roller is hardly influenced by the discharge guide which is stopped, a conveyance speed of the sheet can be prevented from fluctuating.

Therefore, in the image reading device of the present disclosure, it is possible to prevent the reading accuracy of the reading sensor from deteriorating.

What is claimed is:

1. An image reading device comprising:

a supply tray configured to support a sheet to be supplied, the support tray including a movable plate that is configured to move from a first position to a second position according to a decrease in the number of the sheet to be supported by the supply tray, the second position being higher than the first position;

a discharge tray positioned below the supply tray, the discharge tray being configured to support the sheet to be discharged;

a conveyance guide configured to convey the sheet from the supply tray to the discharge tray;

a reading sensor which reads an image on the sheet to be conveyed on the conveyance guide;

a discharge guide including a discharge opening for discharging the sheet conveyed by the conveyance guide to the discharge tray, the discharge guide being configured to be movable from a third position to a fourth position a according to the decrease in the number of the sheet to be supported by the supply tray, the fourth position being higher than the third position;

a discharge roller configured to discharge the sheet through the discharge opening; and a controller that operates to perform a first drive operation for rotating the discharge roller, and a second drive operation for moving the discharge guide between the third position and the fourth position, wherein the controller is configured to stop the first drive operation when performing the second drive operation, and stop the second drive operation when performing the first drive operation.

2. The image reading device according to claim 1 further comprising:

a first drive source configured to generate a first drive force;

a first drive train configured to transmit the first drive force from the first drive source to the movable plate;

a second drive source configured to generate a second drive force; and a second drive train configured to transmit the second drive force from the second drive source to the discharge guide, wherein the controller operates to perform:

a third drive operation for moving the movable plate between the first position and the second position by operating the first drive source and the first drive train; and the second drive operation by operating the second drive source and the second drive train.

3. The image reading device according to claim 2 further comprising:

a third drive train configured to transmit the first drive force from the first drive source to the discharge roller, wherein the controller operates to perform the first drive operation by operating the first drive source and the third drive train.

4. The image reading device according to claim 3, wherein the first drive train includes an electromagnetic clutch that switches between a connected state and a cut-off state by being controlled by the controller, and wherein the controller operates to control the electromagnetic clutch to switch from the cut-off state to the connected state to operate the first drive source and the first drive train, thereby performing the third drive operation.

5. The image reading device according to claim 4 further comprising:

a conveyance roller configured to convey the sheet to the discharge roller; and a fourth drive train configured to transmit the first drive force from the first drive source to the conveyance roller to rotate the conveyance roller.

6. The image reading device according to claim 3 further comprising:

a first side frame; and a second side frame, wherein the conveyance guide is provided between the first side frame and the second side frame in an axial direction of the discharge roller, wherein the second drive train is provided on a side of the first side frame, and wherein the first drive train and the third drive train are provided on a side of the second side frame.

* * * * *